(12) United States Patent
Chupka et al.

(10) Patent No.: US 9,328,445 B2
(45) Date of Patent: *May 3, 2016

(54) MODE SHIFTER WITH A LEAF SPRING YOKE FOR A WASHING MACHINE APPLIANCE

(71) Applicant: General Electric Company, Schenectady, NY (US)

(72) Inventors: Edward Simeon Chupka, Bardstown, KY (US); Stephen Bernard Froelicher, Sheperdsville, KY (US)

(73) Assignee: General Electric Company, Schenectady, NY (US)

( * ) Notice: Subject to any disclaimer, the term of this patent is extended or adjusted under 35 U.S.C. 154(b) by 633 days.

This patent is subject to a terminal disclaimer.

(21) Appl. No.: 13/719,386

(22) Filed: Dec. 19, 2012

(65) Prior Publication Data

US 2014/0165661 A1 Jun. 19, 2014

(51) Int. Cl.
| | |
|---|---|
| *D06F 37/40* | (2006.01) |
| *D06F 33/06* | (2006.01) |
| *F16D 23/12* | (2006.01) |
| *F16D 11/10* | (2006.01) |
| *D06F 23/04* | (2006.01) |

(52) U.S. Cl.
CPC ............. *D06F 33/06* (2013.01); *D06F 37/40* (2013.01); *F16D 11/10* (2013.01); *F16D 23/12* (2013.01); *D06F 23/04* (2013.01)

(58) Field of Classification Search
CPC ........ D06F 37/40; D06F 37/304; D06F 23/04
See application file for complete search history.

(56) References Cited

U.S. PATENT DOCUMENTS

| | | | |
|---|---|---|---|
| 6,176,108 B1 | 1/2001 | Bae et al. | |
| 6,332,343 B1 * | 12/2001 | Koketsu et al. | ................. 68/23.7 |
| 7,171,715 B2 | 2/2007 | Yoon et al. | |
| 7,409,737 B2 | 8/2008 | Cho et al. | |
| 7,418,841 B2 | 9/2008 | Yoon et al. | |
| 7,543,464 B2 | 6/2009 | Choi et al. | |
| 2010/0175437 A1 * | 7/2010 | Kim | ...................... D06F 37/206 68/23 R |

* cited by examiner

*Primary Examiner* — David Cormier
*Assistant Examiner* — Irina Graf
(74) *Attorney, Agent, or Firm* — Dority & Manning, P.A.

(57) ABSTRACT

A clutch positioning assembly for a washing machine appliance is provided. The assembly uses a cam that can be rotated so as to position the clutch between different positions that provide for engaging or disengaging a motor from a wash basket. A leaf spring, configured as a yoke in one exemplary embodiment, provides a force to urge the clutch into a position that e.g., disengages the wash basket from the motor during e.g., wash modes while also allowing the clutch to be moved into a position that engages the wash basket with the motor during spin modes. The clutch positioning assembly can be provided as a modular unit that is connected with the appliance during manufacturing.

11 Claims, 10 Drawing Sheets

100 # MODE SHIFTER WITH A LEAF SPRING YOKE FOR A WASHING MACHINE APPLIANCE

FIELD OF THE INVENTION

The subject matter of the present disclosure relates generally to a mechanism for switching a washing machine appliance between certain modes of operation.

BACKGROUND OF THE INVENTION

Washing machines are typically equipped to operate with one or more modes or cycles such as wash, rinse, and spin modes. During a wash or rinse mode for a vertical axis washing machine, the laundry articles are usually submerged at least partially within a wash or rinse fluid while an agitator is used to impart motion to the laundry articles that are contained within a wash basket. A wash tub contains the fluid, agitator, and wash basket.

During a wash or rinse mode, the wash basket remains stationary while the agitator rotates to impart movement to the laundry articles. During a spin mode, typically both the agitator and the wash basket are rotated so as to subject the articles in the laundry to centrifugal forces. These forces cause water and other fluids to be wrung from the clothes. These liquids can exit the wash basket through holes positioned along the outer wall of the wash basket for subsequent removal from the wash tub.

For operation of the washing machine appliance between the wash, rinse, and spin modes, it is desirable to independently control the movement of the agitator and wash basket. More specifically, during the wash and rinse modes, the wash basket may be held stationary while the agitator is rotated so as to impart movement to the laundry articles. During the spin mode, however, rotation of the wash basket is required to wring liquid from the articles as set forth above.

In order to control the rotation of the agitator and wash basket, a vertical axis washing machine can be equipped with e.g., a clutch for engaging and disengaging the wash basket from a motor that can be used to rotate the agitator and/or wash basket. As the washing machine executes a cleaning process, the clutch is operated at certain times in order to provide the desired movement of the agitator and wash basket during one or more wash, rinse, and/or spin cycles. To prevent damage to the appliance, proper engagement and disengagement of the clutch during operation is desirable.

Conventionally, movement of the clutch has typically been performed using e.g., linear actuators involving complex linkages having multiple parts. For example, some include mechanisms that translate between horizontal and vertical movements to position a clutch. Typically, the parts for these mechanisms must be collected and assembled during manufacture of the washing machine rather than being provided as a modular unit.

Accordingly, a washing machine appliance that can shift between various modes or cycles of operation would be useful. More particularly, a mechanism or assembly for positioning the clutch of a washing machine appliance so as to determine the relative motion of the agitator and wash basket between various modes of operation would be beneficial. Such a mechanism that can be provided as a modular unit during manufacturing would also be useful. One or more features that help ensure that the clutch is properly engaged or disengaged for different modes of operation would also be useful.

BRIEF DESCRIPTION OF THE INVENTION

A clutch positioning assembly for a washing machine appliance is provided. The assembly uses a cam that can be rotated so as to position the clutch between different positions that provide for engaging or disengaging a motor from a wash basket. A leaf spring, configured as a yoke in one exemplary embodiment, provides a force to urge the clutch into a position that e.g., disengages the wash basket from the motor during e.g., wash modes while also allowing the clutch to be moved into a position that engages the wash basket with the motor during spin modes. The clutch positioning assembly can be provided as a modular unit that is connected with the appliance during manufacturing. Additional aspects and advantages of the invention will be set forth in part in the following description, or may be apparent from the description, or may be learned through practice of the invention.

In one exemplary embodiment, the present invention provides a washing machine appliance that includes a wash tub for the receipt of laundry articles and fluid for cleaning and a wash basket received into the wash tub. The wash basket is configured for retaining the laundry articles during the cleaning process. An agitator is positioned in the wash basket and is configured for imparting motion to the articles within the wash basket. A motor is provided for selectively rotating one or both of the agitator and the wash basket. An agitator drive element is connected to the agitator and is driven by the rotation of the motor. A wash basket drive element is connected to the wash basket and is configured for selective rotation by the motor. A clutch is configured for shifting movement along the wash basket drive element so as to selectively position the clutch between i) an engaged position in which the clutch connects the motor and the wash basket drive element so that both the agitator and the wash basket are rotated by the motor, and ii) a disengaged position in which the clutch disconnects the motor and the wash basket drive element such that the agitator is rotated while the rotation of the wash basket is prevented. A yoke is provided having a pair of arms positioned in contact with the clutch. The yoke is rotatable about a pivot axis and is configured for selectively applying a force to move the clutch into the disengaged position.

In another exemplary embodiment, the present invention provides a clutch positioning assembly for a clutch of an appliance. The clutch is configured for shifting movement between an engaged position and a disengaged position. The clutch positioning assembly includes a yoke having a pair of arms extending into in contact with the clutch. A cam follower is connected with the yoke. The cam follower and the yoke are rotatable about a pivot axis. A rotatable cam has an inclined surface upon which the cam follower rides as the cam is rotated. Rotation of the cam causes the cam follower and yoke to rotate about a pivot axis so as to shift the clutch between the engaged position and the disengaged position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

In FIG. 3, the clutch is shown in a mode that prevents the wash basket from rotating.

DETAILED DESCRIPTION OF THE INVENTION

Figure 1:
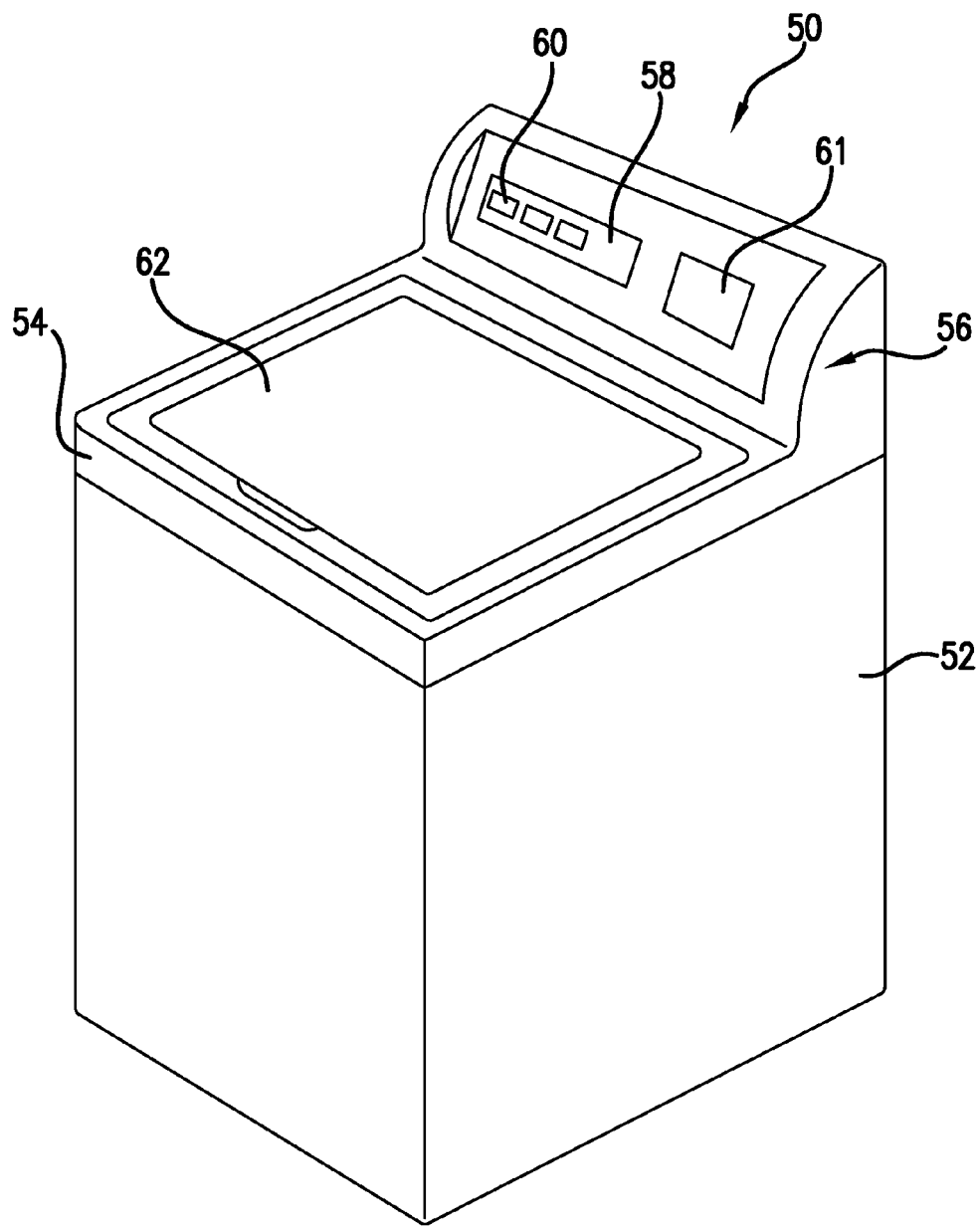
FIG. 1 provides a perspective view of an exemplary embodiment of a washing machine appliance of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
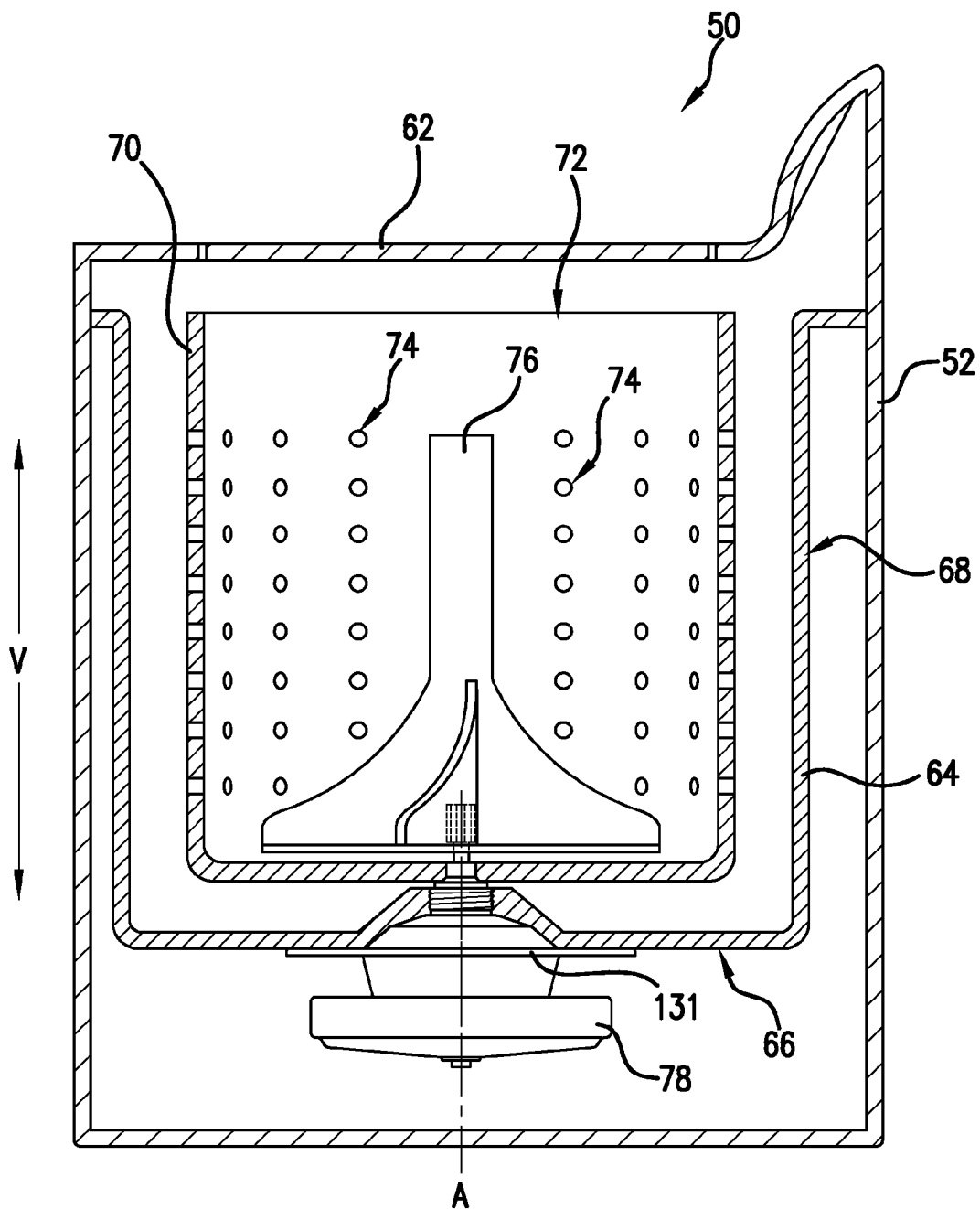
FIG. 2 is a side cross-sectional view of the exemplary embodiment of FIG. 1.

FIG. 1 is a perspective view of an exemplary vertical axis washing machine 50 including a cabinet 52 and a top cover 54. FIG. 2 is a side cross-sectional view of the exemplary embodiment of FIG. 1. A backsplash 56 extends from cover 54, and a control panel 58 including a plurality of input selectors 60 is coupled to backsplash 56. Control panel 58 and input selectors 60 collectively form a user interface input for operator selection of machine cycles and features. For example, in one embodiment, a display 61 indicates selected features, a countdown timer, and/or other items of interest to machine users.

A door or lid 62 is mounted to cover 54 and is rotatable about a hinge (not shown) between an open position (not shown) facilitating access to wash tub 64 located within cabinet 52, and a closed position (shown in FIG. 1) forming an enclosure over wash tub 64. Wash tub 64 includes a bottom wall 66 and a sidewall 68. A basket 70 that is rotatably mounted within wash tub 64. A pump assembly (not shown) is located beneath tub 64 and basket 70 for gravity assisted flow when draining tub 64.

Referring now to FIG. 2, wash basket 70 is movably disposed and rotatably mounted in wash tub 64 in a spaced apart relationship from tub sidewall 68 and the tub bottom 66. Basket 70 includes an opening 72 for receiving wash fluid and a washload therein. Basket 70 includes a plurality of perforations 74 therein to facilitate fluid communication between an interior of basket 70 and wash tub 64.

An agitation element 76, such as a vane agitator, impeller, auger, or oscillatory basket mechanism, or some combination thereof is disposed in basket 70 to impart an oscillatory motion to articles and liquid in basket 70. In different embodiments, agitation element 76 includes a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 76 and wash basket 70 are oriented to rotate about a vertical axis A (which is substantially parallel to vertical direction V). Basket 70 and agitator 76 are driven by permanent magnet synchronous motor 78, which operates to turn or rotate agitator 76 and/or basket 70 with tub 64 as will be more fully described below.

Operation of machine 50 is controlled by a controller or processing device (not shown) that is operatively coupled to the user interface input 58 located on washing machine backsplash 56 (shown in FIG. 1) for user manipulation to select washing machine cycles and features. In response to user manipulation of the user interface input 58, the controller operates the various components of machine 50 to execute selected machine cycles and features.

In an illustrative embodiment, laundry items are loaded into basket 70, and washing operation is initiated through operator manipulation of control input selectors 60 (shown in FIG. 1). Wash tub 64 is filled with water and mixed with detergent to form a wash fluid. The contents of the basket 70 are agitated with agitation element 76 for cleansing of laundry items in basket 70. More specifically, agitation element 76 is moved back and forth in an oscillatory back and forth motion. In the illustrated embodiment, agitation element 76 is rotated clockwise a specified amount about the vertical axis A of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 76 during the strokes imparts mechanical energy to articles in basket 70 for cleansing action. The strokes may be obtained in different embodiments with a reversing motor, a reversible clutch, or other known reciprocating mechanism.

After the agitation phase of the wash cycle is completed, tub 64 is drained with the pump assembly. Laundry items are then rinsed and portions of the cycle repeated, including the agitation phase, depending on the particulars of the cleaning process selected by a user. Preferably, basket 70 is held in a fixed position during portions of the wash and rinse cycles while agitator 76 is oscillated as described.

One or more spin cycles may also be used as part of the cleaning process. In particular, a spin cycle may be applied after the wash cycle and/or after the rinse cycle in order to wring wash fluid from the articles being washed. During a spin cycle, basket 70 is rotated at relatively high speeds to help wring fluid from the laundry articles through holes 74.

Figure 3:
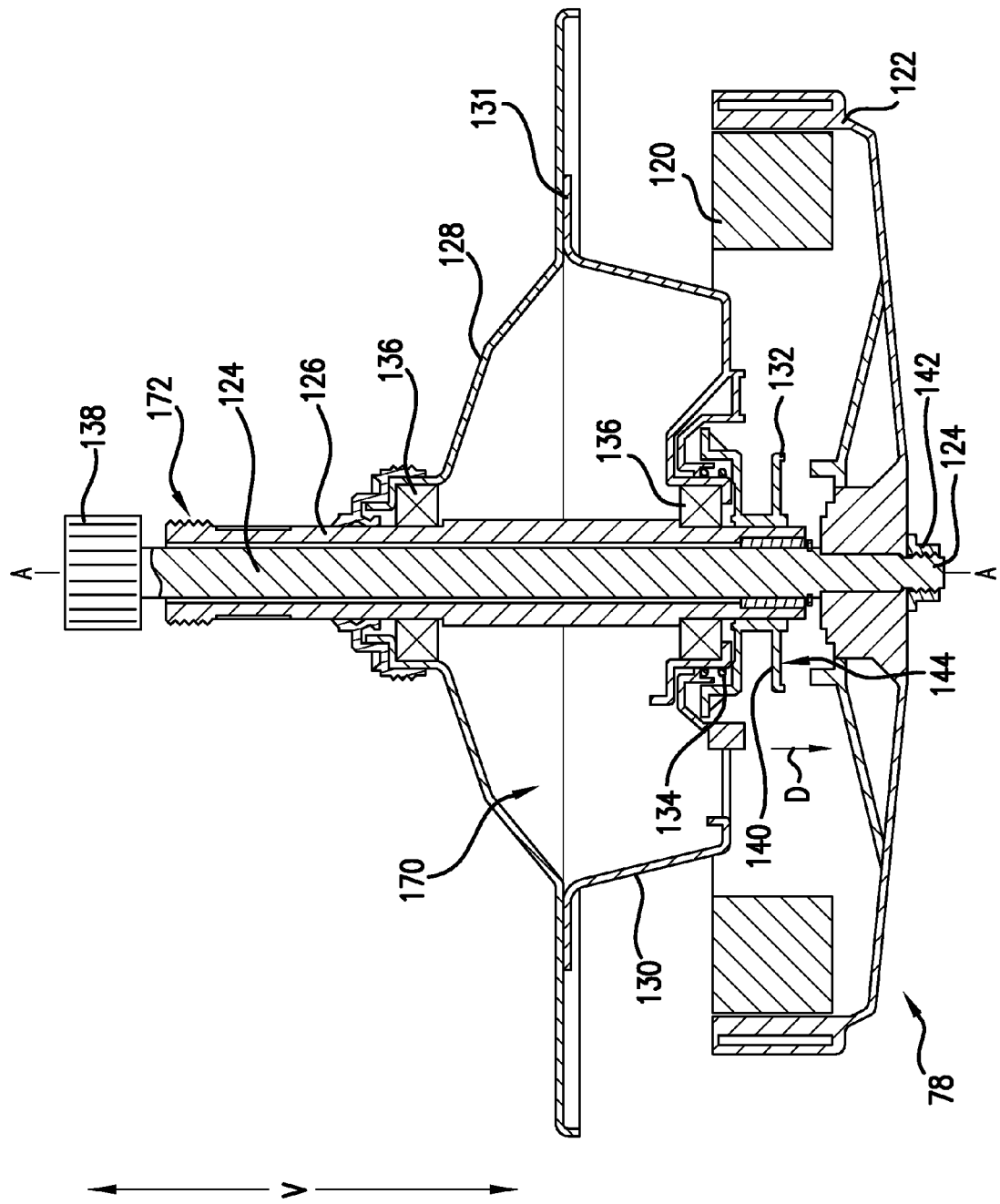
FIG. 3 is a cross-sectional view of an exemplary embodiment of a motor, shaft, and clutch as may be used in the washing machine of FIGS. 1 and 2.

FIG. 3 provides a cross-sectional view of motor 78, which includes stator 120 and rotor 122. When energized with the appropriate power, rotor 122 is caused to rotate while stator 120 remains fixed. Rotor 122 is attached to one end of a shaft or agitator drive element 124 through coupling 142. Agitator drive element 124 extends vertically and is connected with coupling 138 at the end opposite of coupling 142. Coupling 138 attaches agitator drive element 124 to agitator 76.

Stator 120 is attached to a bearing housing 131 formed by lower clam shell 130 attached to upper clam shell 128. The bottom wall 66 of wash tub 64 is attached to upper clam shell 128 of bearing housing 131 (FIG. 1). Bearing housing 131 forms a cavity 170 into which at least a portion of certain components of an exemplary clutch positioning assembly are received as will be further described.

A spin tube or wash basket drive element 126 is concentric with agitator drive element 124. Wash basket drive element 126 is connected with wash basket 70 at threaded end 172. Agitator drive element 124 can rotate within wash basket drive element 126 even if element 126 (and, therefore, wash basket 70) is held in a fixed position. Wash basket drive element 126 can also rotate within upper and lower clam shells 128 and 130 of bearing housing 131, which is mounted on wash basket drive element 126 using a pair of bearings 136. The position of wash basket drive element 126 can be fixed to hold wash basket 70 stationary while agitator 76 is oscillated during e.g., a wash or rinse cycle. Alternatively wash basket drive element 126 and, therefore, wash basket 70 can also be rotated with agitator 76 during a spin cycle.

To selectively control the rotation of wash basket 70, clutch 132 is used to engage and disengage wash basket drive element 126 from rotor 122. In FIG. 3, clutch 132 is shown in an upward, disengaged position in which wash basket drive element 126 is disengaged from rotor 122 such that the rotation of wash basket 70 is prevented while agitator 76 is rotated (e.g., during wash and rinse cycles). In this position, clutch 132 is engaged with bearing housing 131 which is attached to wash tub 64. Conversely, clutch 132 can be shifted downward (arrow D in FIG. 3) to an engaged position shown in FIG. 4 in which wash basket drive element 126 is engaged with rotor 122 such that wash basket 70 and agitator 76 are rotated simultaneously by rotor 122. To return to the position shown in FIG. 3, clutch 132 can be shifted upward (arrow U in FIG. 4).

Figure 4:
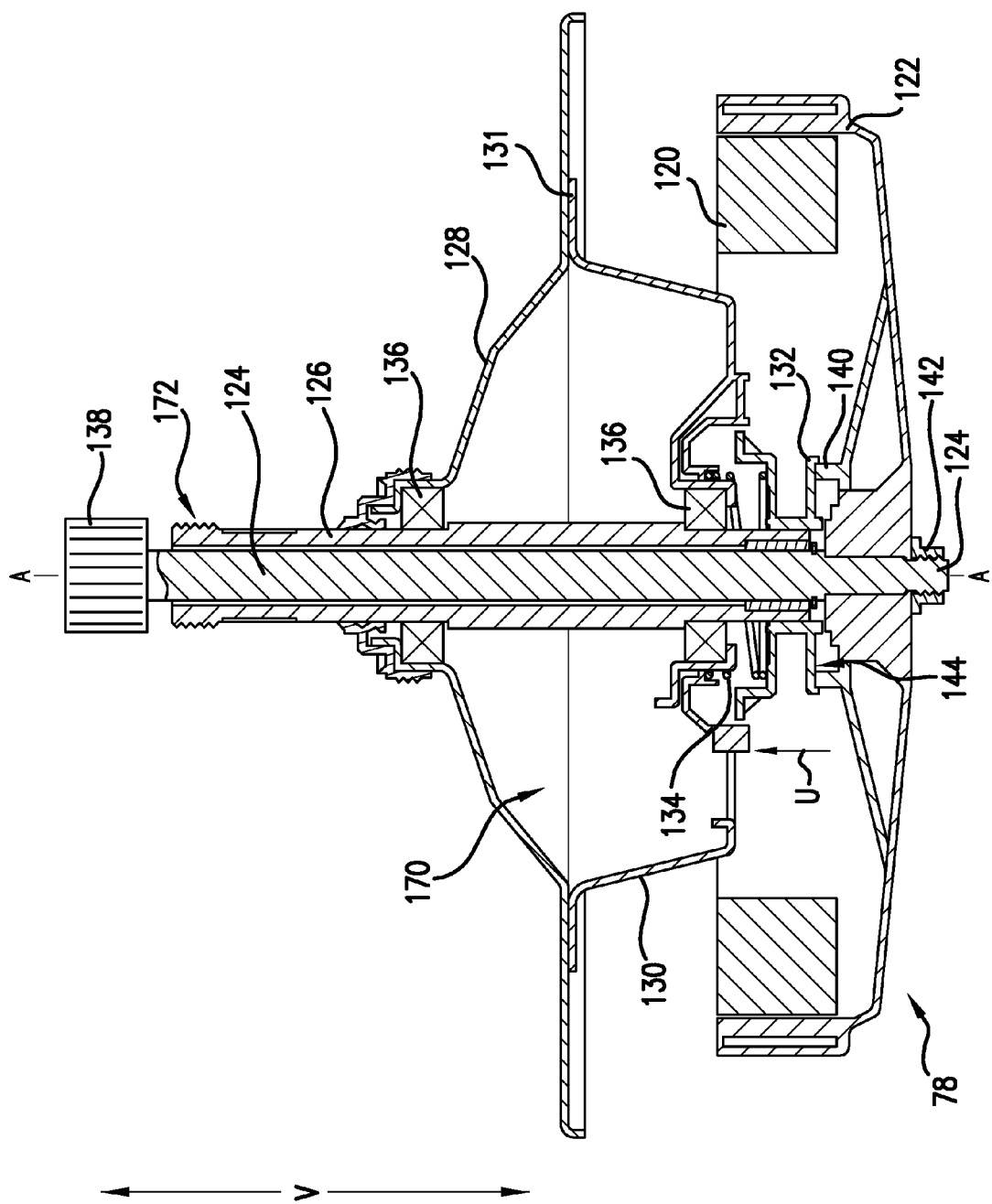
FIG. 4 is a cross-sectional view of the exemplary embodiment of a motor, shaft, and clutch as illustrated in FIG. 3, except that the clutch is shown in a mode that provides for rotation of the wash basket.
Figure 5:
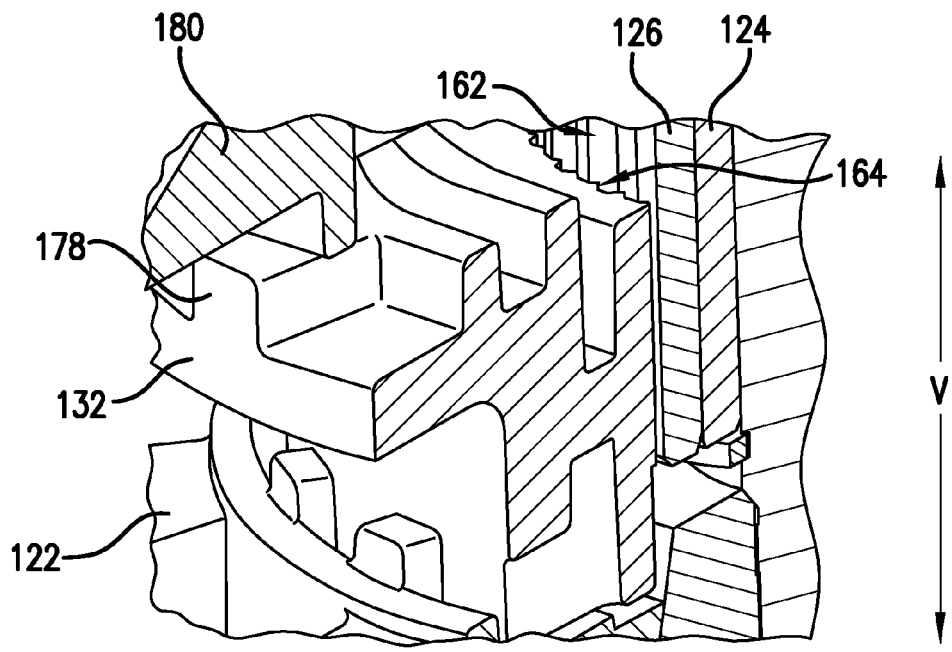
FIG. 5 is a close up, partial cross-sectional view of a portion of an exemplary clutch and other components as may be used with the present invention.
Figure 6:
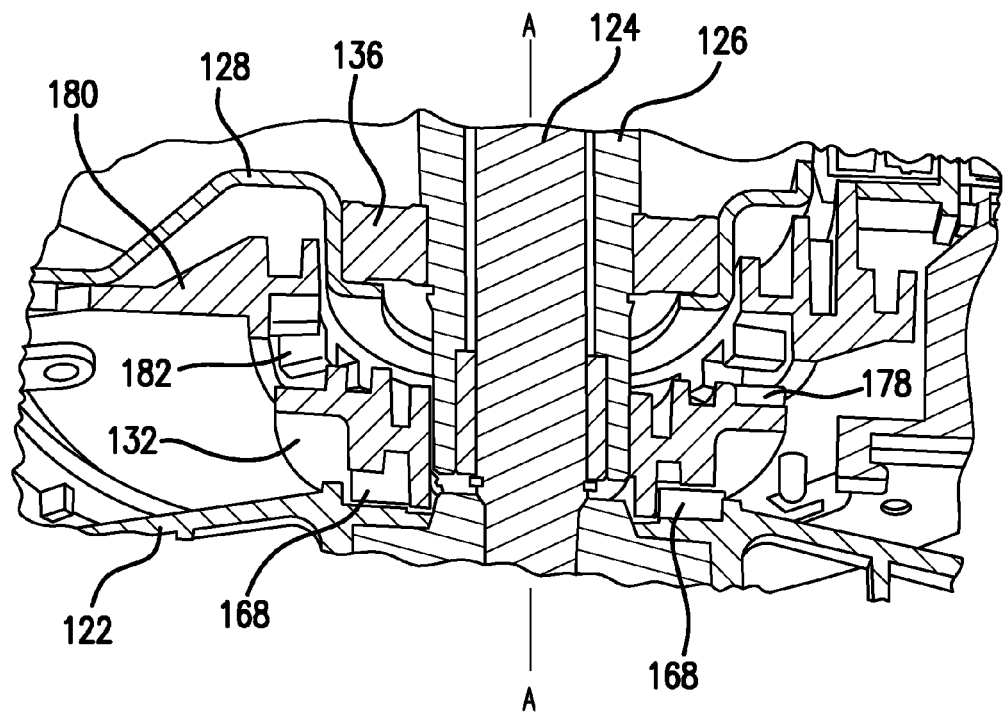
FIG. 6 is a close up, cross-sectional view of a portion of an exemplary clutch and other components as may be used with the present invention. The perspective of the view is at an angle from the plane of the cross-section.

FIG. 5 is a close up, partial cross-sectional view of a portion of the exemplary clutch 132 shown in FIGS. 3 and 4. FIG. 6 is a close up, cross-sectional view of a portion of exemplary clutch 132 albeit at a different angle from that used for FIG. 5. A view of the bottom of clutch 132 is provided in FIG. 7 as well.

As shown, the outside surface of wash basket drive element 126 includes a first plurality of spline teeth 162 oriented along the vertical direction V and positioned circumferentially about element 126. Clutch 132 includes a central opening (FIG. 7) 166 into which the wash basket drive element 126 is slidably received. Clutch 132 defines a second plurality of spline teeth 164 that mesh with spline teeth 162. As shown, teeth 162 and 164 are positioned on opposing sides of clutch 132 along vertical direction V. Accordingly, clutch 132 can shift along the wash basket drive element 126 in vertical direction V while, at the same time, the rotation of clutch 132 will cause wash basket drive element 126 to also rotate.

Clutch 132 also includes a first plurality of teeth 168 along one side and a second plurality of teeth 178 along an opposing side. Teeth 168 mesh with teeth (not shown) on rotor 122 whenever clutch 132 is the engaged position so as to rotate wash basket 70. Conversely, teeth 178 mesh with teeth 182 of a platform lock 180 whenever clutch 132 is in the disengaged position so that wash basket 70 is precluded from rotating while agitator 76 is rotated.

Figure 7:
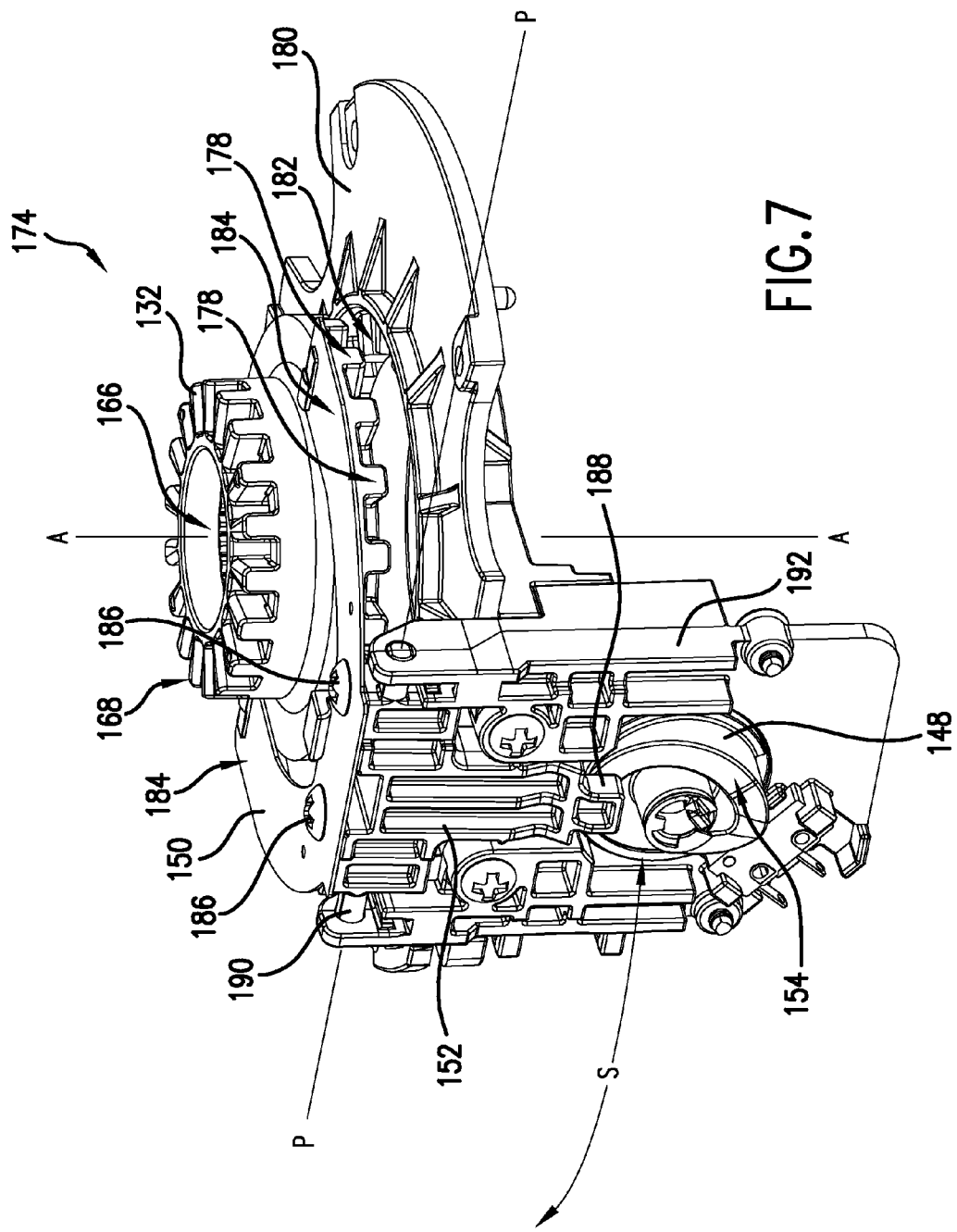
FIGS. 7 and 8 are perspective views of an exemplary embodiment of a clutch positioning assembly with a rotational cam for shifting the clutch shown in FIGS. 3-6 between different modes of operation for a washing machine appliance.
Figure 8:
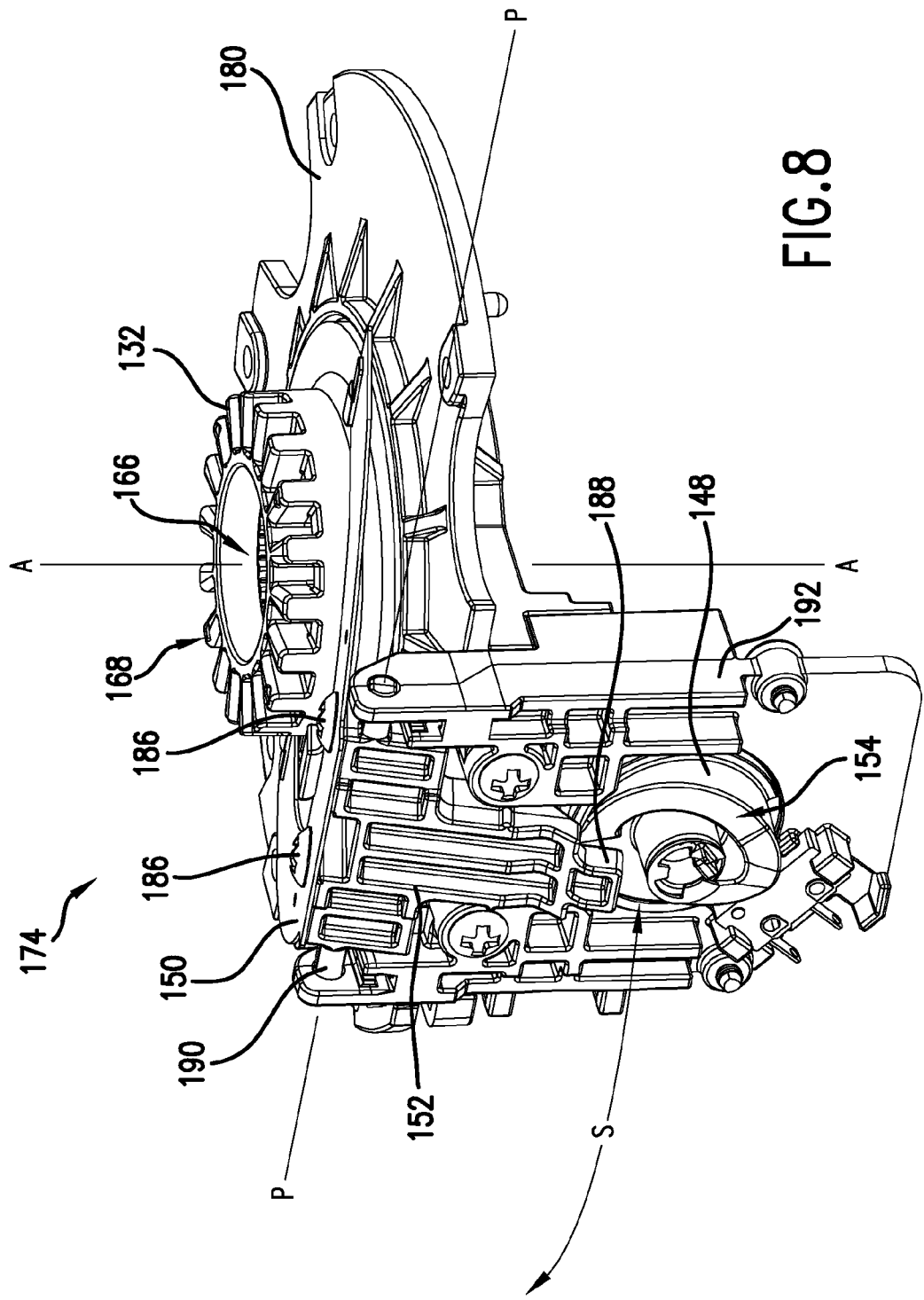
Figure 9:
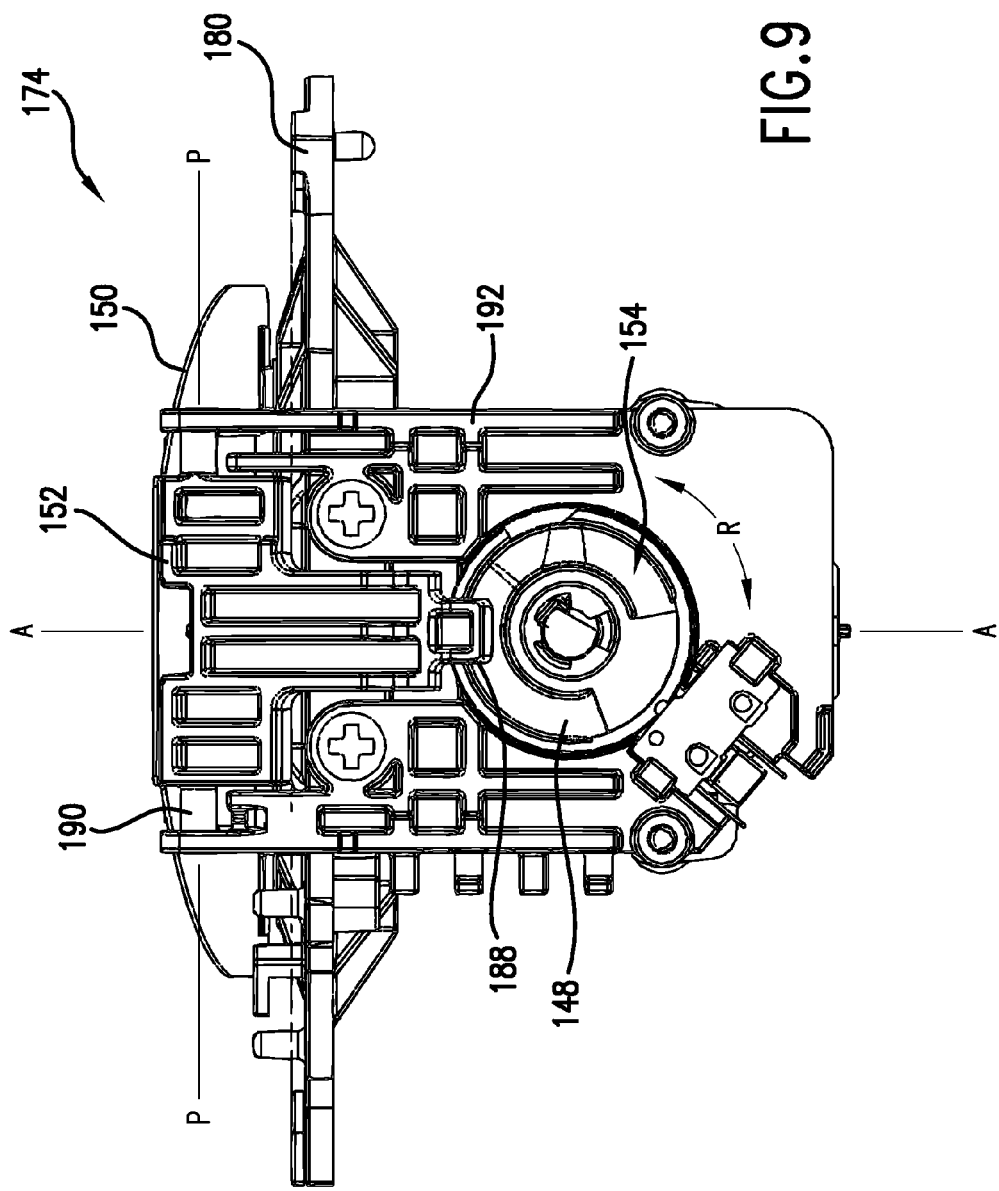
FIG. 9 is an elevation view of the exemplary embodiment of a clutch positioning assembly shown in FIGS. 7 and 8.
Figure 10:
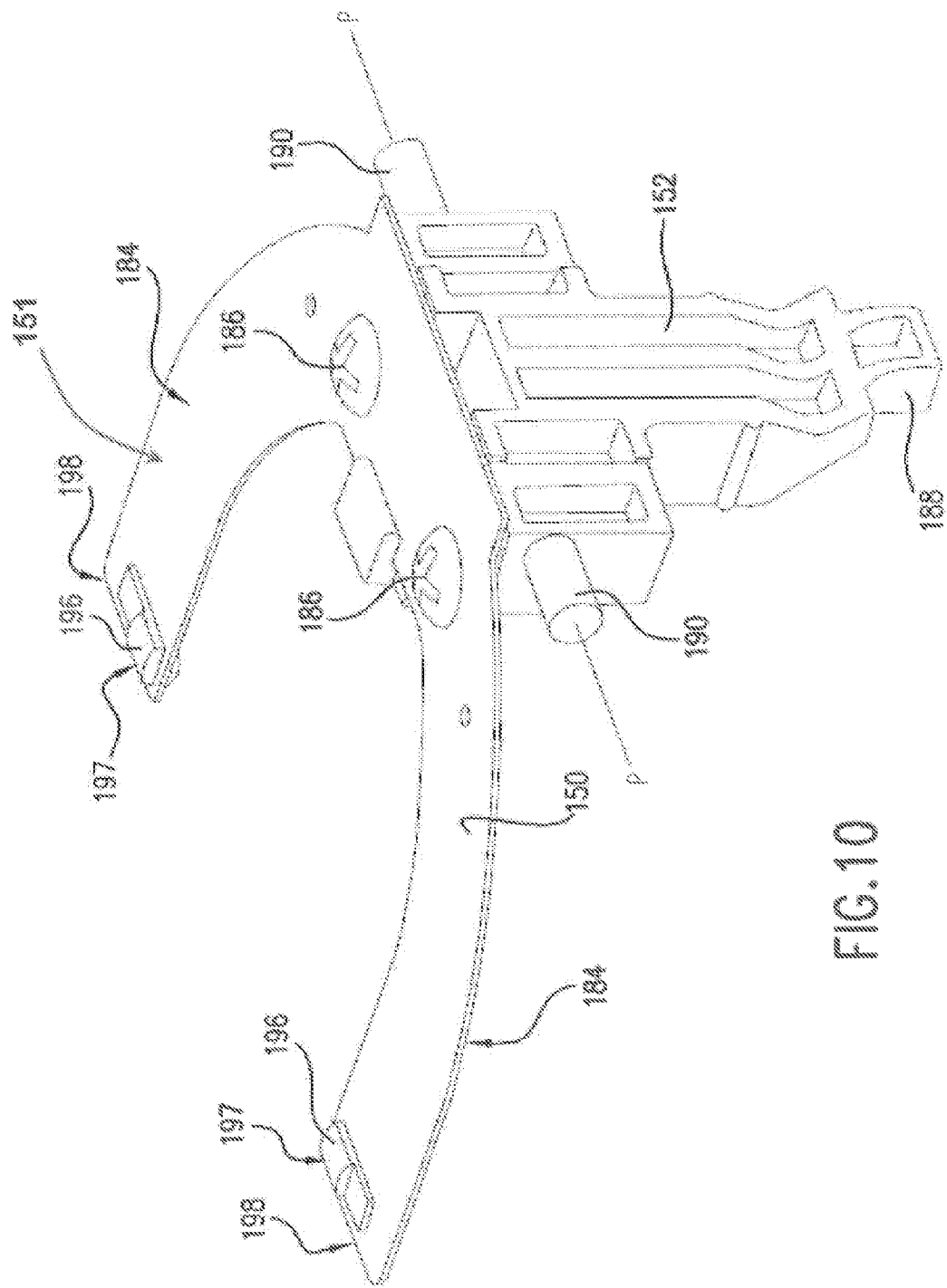
FIG. 10 is a perspective view of certain components of the exemplary clutch positioning assembly of FIGS. 7-9.

FIGS. 7-9 provide exemplary embodiments of a clutch positioning assembly 174 (i.e. a mode shifter) of the present invention. FIG. 10 provides a perspective view where certain components of clutch positioning assembly 174—particularly a yoke 150 and a cam follower 152—as shown in isolation. In FIGS. 7-10, for purposes of additional clarity in describing the invention, assembly 174 is shown in an orientation where clutch 132 is inverted from that which is shown in FIGS. 3-6. Assembly 174 is used to shift clutch 132 along axis A (and vertical direction V) between the engaged and disengaged positions as described to selectively control the mode of operation of wash basket 70 between spinning modes and non-spinning modes such as would be used e.g., with wash, rinse, and spin cycles. Assembly 174 is fixed to bearing housing 131 by connecting platform lock 180 to lower clam shell 130.

As shown, clutch positioning assembly 174 includes a yoke 150, shown in FIG. 7 as leaf spring 151, that is in contact with clutch 132. More particularly, yoke 150 includes a pair of arms 184 (FIG. 7) that extend into contact with clutch 132 on opposing sides of the axis of rotation A. For this exemplary embodiment, yoke 150 is Y-shaped as best seen in FIG. 10. Yoke 150 is connected with a cam follower 152 using fasteners 186.

For this exemplary embodiment, yoke 150 with arms 184 can be used to provide a force to push (i.e. lift) clutch 132 in in the vertical direction V along axis A. The force provided by yoke 150 causes the second plurality of teeth 178 to mesh with teeth 182 of the platform lock 180 when assembly 174 is operated to move clutch 132 from the engaged position to the disengaged position. In addition, yoke 150 can absorb vibrations of clutch 132 that may occur as it is engaged or disengaged from rotor 122.

Also, if teeth 178 and 182 are not properly aligned with each other, tooth on tooth contact can occur that prevents proper meshing. As such, it may be necessary to jog or partially rotate rotor 122. As such jogging occurs, yoke 150 uses arms 184 to contact clutch 132 on opposing sides of axis A to provide a force against clutch 132 on the opposing sides of axis A. This force moves clutch 132 into position once teeth 178 are properly aligned with teeth 182. In one exemplary embodiment, yoke 150 provides a force in the range of e.g., 5 to 15 pounds along vertical direction V. Yoke 150 can be constructed by stamping a metal such as e.g., a full hardened 301 stainless steel. Other materials and/or embodiments may be used as well.

As best seen in FIG. 10, yoke 150 includes multiple pads 196 positioned at the distal ends 198 of the arms 184 of yoke 150, Pads 196 have a smooth, curved surface 197 for contact with clutch 132. Pads can be constructed from e.g., a plastic material. As such, pads 196 help prevent wear that can occur from metal on metal contact and also provide for a positive determination of the location where arms 184 will contact clutch 132.

Cam follower 152 includes a finger 188 that rides on a curved and inclined surface 154 of rotatable cam 148. A motor (not shown) can be used to selectively rotate cam 148 in either direction as shown by arrow R in FIG. 9. The motor can be e.g., operably connected with the controller of washing machine 50. Cam 148 includes a curved, inclined surface 154. As the motor rotates cam 148, finger 188 of cam follower 152 rides inclined surface 154, which causes finger 188 to shift outwardly or inwardly (arrows S) depending upon the direction of rotation of cam 148. For example, in FIG. 7 finger 188 of cam follower 152 has moved towards the axis of rotation A while in FIG. 8 finger 188 has moved away from axis of rotation A. For the exemplary embodiment shown in the figures, the axis of rotation of cam 148 is substantially perpendicular to axis A.

As finger 188 so moves based on the rotation of cam 148, cam follower 152 and yoke 150 pivot about a pivot axis P. More specifically, a pair of pins 190 extend in an opposing manner from the sides of cam follower 152. Pins 190 are rotatably received into a frame 192 that is attached to platform lock 180. Cam follower 152 and yoke 150 are pivotable about the pivot axis P provided by pins 190. In an alternative embodiment, pins 190 can be replaced by a shaft or axle that extends through cam follower 152 and received on opposing ends by frame 192. Accordingly, the movement of finger 188 along the direction of arrows S also causes yoke 150 to shift the position of clutch 132 vertically along the axis of rotation A.

Accordingly, in FIG. 7, finger 188 has been moved towards axis of rotation A such that yoke 150 is moved vertically along the axis of rotation A away from platform lock 180. As a result, clutch 132 is also moved vertically along the axis of rotation A away from platform lock 180 to an engaged position where teeth 168 will contact teeth on rotor 122 of motor 78 so as to rotate wash basket 70. The movement of clutch 132 is assisted by a clutch spring 134 (FIGS. 3 and 4) positioned between clutch 132 and platform lock 180. More particularly, clutch spring 134 is used to urge clutch 132 towards the engaged position.

Conversely, in FIG. 8, finger 188 has been moved away from the axis of rotation A such that yoke 150 urges clutch 132 vertically along the axis of rotation A towards platform lock 180. As a result, teeth 178 of clutch 132 engage teeth 182 of platform lock 180 so that clutch 132 is now in a disengaged position and wash basket 70 is prevented from rotating with agitator 76. Thus, clutch spring 134 and the arms of yoke 150 contact clutch 132 in an opposing manner. For example, clutch spring 134 urges clutch 132 downwardly along vertical direction V while the arms 184 of yoke 150 urge clutch 132 in an opposing direction along vertical direction V.

Figure 11:
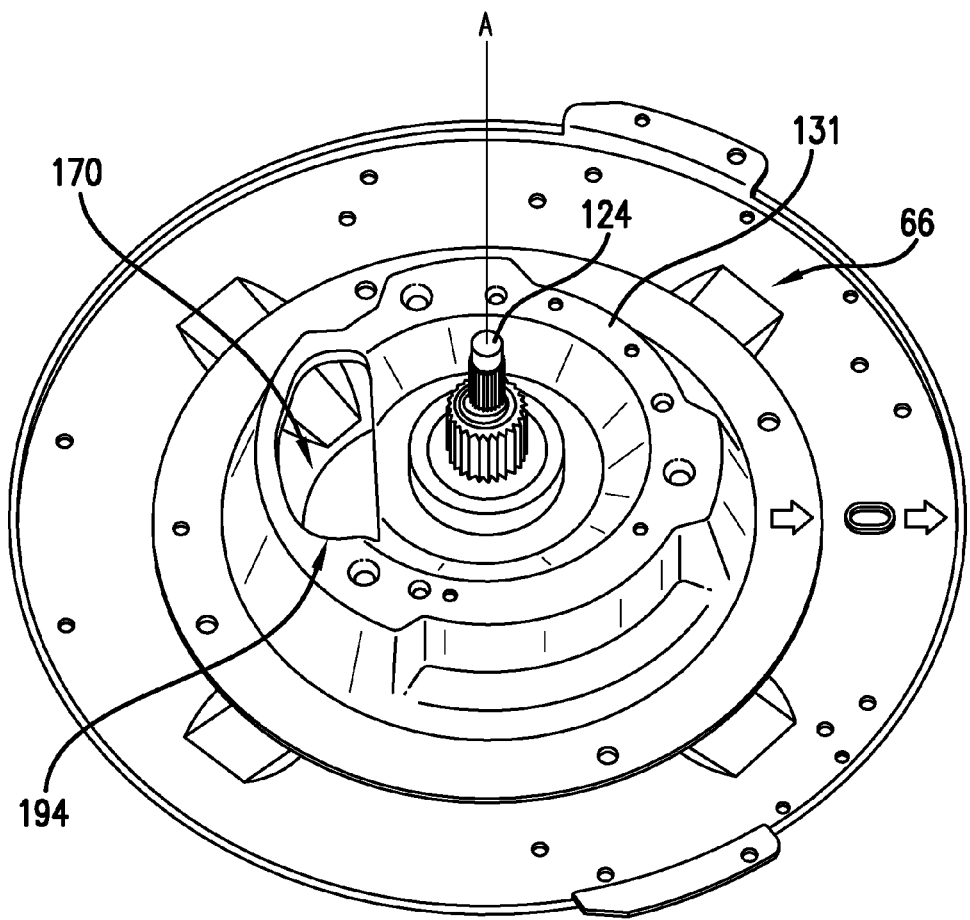
FIG. 11 is a perspective view of an exemplary embodiment of a bearing housing as may be used with the washing machine appliance of e.g., FIGS. 1 and 2.

FIG. 11 shows a view of the bottom wall 66 of wash tub 64 with bearing housing 131 attached as shown. During manufacturing of appliance 50, housing 131 provides an opening 194 through which at least a portion of clutch positioning assembly 174 can be received into cavity 170. As such, motor 78 and clutch positioning assembly 174 can be provided as a single, modular unit for connection with housing 131 so as to improve the efficiency of the manufacturing process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
a wash tub for the receipt of laundry articles and fluid for cleaning;
a wash basket received into the wash tub, the wash basket configured for retaining the laundry articles;
an agitator positioned in the wash basket, the agitator configured for imparting motion to the articles within the wash basket;
a motor for selectively rotating one or both of the agitator and the wash basket; an agitator drive element connected to the agitator and driven by the rotation of the motor about an axial direction;
a wash basket drive element connected to the wash basket and configured for selective rotation by the motor;
a platform lock connected with the wash tub;
a clutch comprising a first plurality of teeth along one side of the clutch and a second plurality of teeth positioned on an opposing side of the clutch along the axial direction, the clutch configured for shifting movement along the wash basket drive element so as to selectively position the clutch between i) an engaged position in which the first plurality of teeth engages the motor so as to connect the motor and the wash basket drive element so that both the agitator and the wash basket are rotated by the motor, and ii) a disengaged position in which the second plurality of teeth engages the platform lock so as to disconnect the motor and the wash basket drive element such that the agitator is rotated while the rotation of the wash basket is prevented;
a yoke having a pair of arms positioned in contact with the clutch, wherein the yoke is rotatable about a pivot axis and is configured for selectively applying a force to move the clutch into the disengaged position;
a cam connected with the platform lock including an inclined surface, the cam rotatable relative to the platform lock, the cam defining an axis of rotation separate and discrete from the pivot axis, wherein the axis of rotation of the cam is substantially perpendicular to the axial direction; and
a cam follower connected to the yoke and disposed against the inclined surface to ride thereon, wherein the cam follower and the yoke are rotatable about the pivot axis.

2. A washing machine appliance as in claim 1, the appliance defining an axis of rotation about which the wash basket is rotatable, and wherein the pair of arms of the yoke contact the clutch on opposing sides of the axis of rotation.

3. A washing machine appliance as in claim 1, wherein the cam includes the inclined surface that curves around the axis of rotation of the cam, and upon which the cam follower rides as the cam is rotated; and
wherein rotation of the cam causes the cam follower and the yoke to rotate about the pivot axis so as to shift the clutch between the engaged position and the disengaged position.

4. A washing machine appliance an in claim 3, further comprising a cam motor configured for rotating the cam such that the clutch can be shifted between the engaged position and the disengaged position.

5. A washing machine appliance as in claim 3, further comprising a frame attached to the platform lock; wherein the pivot axis is defined by a shaft that extends through the cam follower and the frame.

6. A washing machine appliance as in claim 1, wherein the wash basket drive element comprises a first plurality of spline teeth, and the clutch comprises a central opening surrounded by a second plurality of spline teeth that engage the first plurality of spline teeth.

7. A washing machine appliance as in claim 1, wherein the wash basket drive element is concentric with the agitator drive element.

8. A washing machine appliance as in claim 1, wherein the wash basket drive element includes a first plurality of spline teeth positioned circumferentially about the wash basket drive element, and wherein the clutch includes a central opening into which the wash basket drive element is slidably received, the clutch also includes a second plurality of spline teeth configured for receipt of the first plurality of spline teeth of the wash basket drive element.

9. A washing machine appliance as in claim 1, further comprising:
   a frame attached to the platform lock; and wherein rotation of the cam causes the cam follower and the yoke to rotate about the pivot axis so as to shift the clutch between the engaged position and the disengaged position, wherein the cam follower and the yoke are rotatable about the pivot axis relative to the frame, and wherein the clutch is vertically positioned along the axial direction between the yoke and the platform lock.

10. A washing machine appliance as in claim 9, further comprising a bearing housing attached to the wash tub, the agitator drive element extending through the bearing housing, and the platform lock attached to the bearing housing.

11. A washing machine appliance as in claim 10, wherein the bearing housing further defines a cavity into which at least a portion of the clutch positioning assembly is received.

* * * * *